March 25, 1958     J. V. HOENE     2,827,729
PORTABLE DUCK BLINDS
Filed Sept. 29, 1955
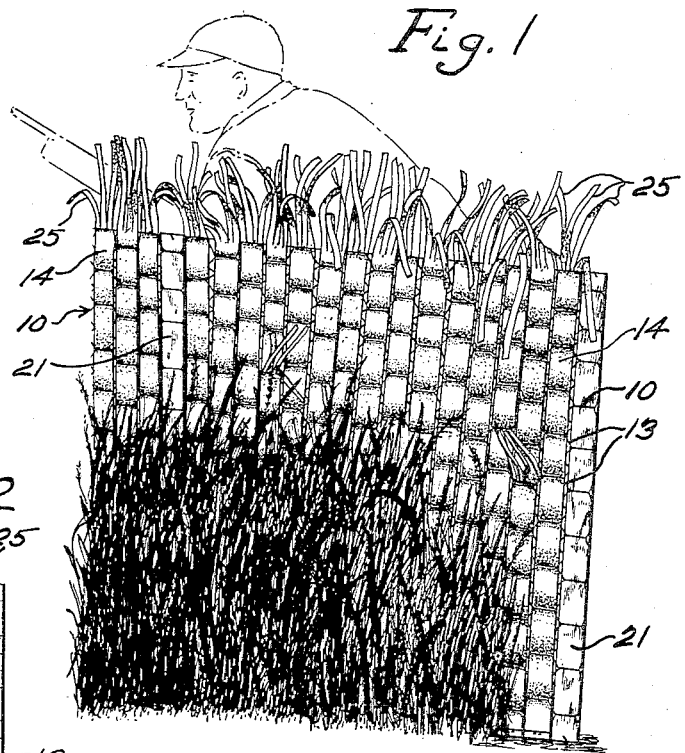
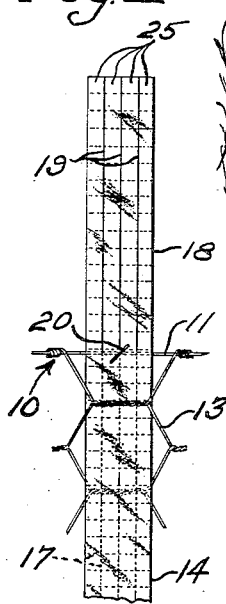
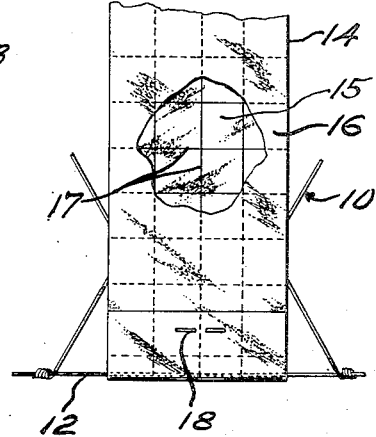
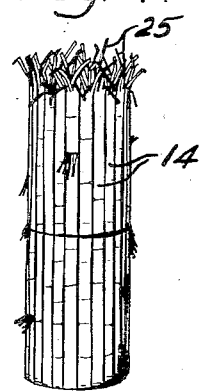
INVENTOR.
John V. Hoene United States Patent Office 2,827,729
Patented Mar. 25, 1958

2,827,729
PORTABLE DUCK BLINDS
John V. Hoene, Duluth, Minn.
Application September 29, 1955, Serial No. 537,320
1 Claim. (Cl. 43—1)

This invention relates to improvements in portable duck blinds.

It is a general object of the present invention to provide a portable duck blind which is light in weight and compact whereby it may be easily carried by a hunter from one hunting location to another.

A further object of the invention is to provide a portable duck blind which is formed in a novel manner from artificial materials to closely simulate natural conditions, the said artificial material being tough, water resistant and treated with special paint whereby it is capable of continued use for several seasons.

A further object of the invention is to provide a portable duck blind as above described which may be readily rolled into a relatively small bundle for shipment, manual transportation, and for compactness when it is being carried in a boat.

A further object of the invention is to provide a portable duck blind which is so formed that it may be readily set up in a variety of ways to best suit the particular conditions.

Other objects of the invention are to provide a portable duck blind which is neat and attractive in appearance, relatively simple and inexpensive to manufacture, light in weight, strong and durable, and otherwise well adapted for the purpose described.

With the above and other objects in view, the invention consists of the improved portable duck blind, and all of its parts and combinations, as set forth in the claim, and all equivalents thereof.

In the accompanying drawing, illustrating one complete embodiment of the preferred form of the invention, in which the same reference numerals designate the same parts in all of the views:

Fig. 1 is a view in front elevation showing a portion of one of the portable duck blinds in a position of use, the hunter being indicated by dot and dash lines;

Fig. 2 is a fragmentary front elevational view showing the upper end of one of the rush-simulating strips and showing a portion of the wire mesh material with which the strips are interwoven;

Fig. 3 is a fragmentary front elevational view showing the lower end of one of the rush-simulating strips illustrating how it is connected to the wire mesh, part of one of the plies of the strip being broken away to show the fiberglass reinforcement; and Fig. 4 is a perspective view showing one of the blinds rolled up for transportation.

Referring more particularly to the drawing, each blind includes a length of wire mesh 10 similar to chicken wire. It is found most convenient to use a twelve and one-half foot length, but this is not critical. The height of the blind may vary, but it is preferred to have a thirty-six inch height for most uses, and a forty-two inch height for use in hiding large boats having seats in which the hunter may either sit or stand. For use in connection with duck boats and canoes, the thirty-six inch height is preferred. The wire mesh includes the usual straight top strand 11 (see Fig. 2) and bottom strand 12 (see Fig. 3), together with the conventional connecting wires which are interlaced to form a multiplicity of hexagons 13, as is conventional.

Interwoven with the wire mesh to extend transversely of the length thereof are a plurality of fibre strips 14. These may be formed of various materials, but it is preferred to utilize a relatively tough paper-like material which is suitably reinforced and treated. The material which it is preferred to use includes a ply 15 and a ply 16 with crossing threads of fibreglass 17 therebetween, the plies 15 and 16 being glued together on opposite sides of the fibreglass strands as shown in Fig. 3. The fibreglass strands strengthen the material and prevent tearing. In addition, the material is preferably resin-impregnated to render it water resistant. It is also sprayed with a suitable paint to simulate natural conditions. It is preferred to employ a flat waterproof, fast drying, fire resistant paint. It is also preferred to have a greenish paint on one side to simulate green vegetation, and a brownish paint on the opposite side to simulate dead grass. One side or the other may be faced outwardly, depending upon the color of the vegetation during the particular season.

These strips are woven in and out of the openings 13 of the wire mesh as shown in Figs. 1, 2 and 3. The lower end of each strip may be folded around the bottom strand 12 of wire and stapled in position as at 18. The upper end of each strip is allowed to project above the wire mesh for a substantial distance as at 18. This end has a plurality of slits 19 to provide a plurality of rush-like ends 25 which may bend over in different ways as shown in Fig. 1 to better simulate the vegetation. Adjacent the lower portions of the projecting ends 25, each of the strips is stapled as at 20 to the upper strand 11 of the wire mesh as shown in Fig. 2.

At each of the ends of the blind it is preferred to use a wooden lath 21 or other rigid material which is also interwoven with the wire mesh. For each blind of twelve and one-half foot length it is preferred to employ five laths suitably spaced apart as indicated by the two laths 21 of Fig. 1. The exact number of laths, however, may be varied to suit requirements. The laths tend to hold the blind in proper upright position against sagging.

In use, the blind may be carried by the hunter while walking or may be loaded into a boat in the rolled-up condition of Fig. 4. If the blind is to be used where there is already a framework for a permanent blind, it may be wrapped around this framework with either the green or dead grass side facing outwardly, according to the season. The mesh may be either nailed or tied to the framework.

If it is desired to hunt on a sandbar, island, or point, the blind may be erected in the form of a relatively small circle surrounding the hunter and placed alongside bushes, grass or stumps. In order to prevent the blind from tipping in a strong wind, short stakes may be pushed into the ground adjacent the blind. If there is a boat near shore that should be hidden, a second portable blind may be laid over the boat.

When hunting in bogs or marshes for mallards, the hunter may carry the portable duck blind in rolled-up condition and can then set it up wherever desired in the midst of grass, rushes or bushes.

When hunting from a boat it is desirable to drive poles into the water and to fasten the blind onto these poles. The hunter may then hunt from behind the blind. If it is necessary to change location, this can be quickly done by removing the blind and poles and setting them up in a new spot.

Due to the impregnated material used for the strips 14, water will not injure the blind. After a day's hunting, even when rolled up, it will quickly dry out if placed near a heater.

Various changes and modifications may be made without departing from the spirit of the invention, and all such changes are contemplated as may come within the scope of the claim.

What I claim is:

A duck blind comprising a length of wire mesh, and a plurality of flat, relatively flexible and foldable, artificial vegetation-simulating treated paper-like strips interwoven transversely of said length of wire mesh with said strips arranged parallel to one another whereby the blind may be rolled up for transportation, said strips being of greater length than the height of the wire mesh so as to have upwardly projecting ends which project beyond the wire, each projecting end being slit into a plurality of relatively narrow strips, and the material of the strips being such that the slit portions will bend under their weight and under the influence of wind to simulate the tops of vegetation.

References Cited in the file of this patent

UNITED STATES PATENTS

| | | |
|---|---|---|
| 55,530 | Park | June 12, 1866 |
| 84,180 | Fletcher | Nov. 17, 1868 |
| 370,157 | Orr | Sept. 20, 1887 |
| 780,180 | Hoefer | Jan. 17, 1905 |
| 955,824 | Nelson | Apr. 19, 1910 |
| 1,058,274 | Tirapani | Apr. 8, 1913 |
| 1,259,641 | Livezey | Mar. 19, 1918 |
| 2,065,804 | Guyer | Dec. 29, 1936 |
| 2,370,734 | Jost | Mar. 6, 1945 |
| 2,753,156 | Rieger | July 3, 1956 |

FOREIGN PATENTS

| | | |
|---|---|---|
| 22,257/29 | Australia | Sept. 22, 1930 |
| 54,220 | Austria | July 10, 1912 |
| 559,159 | Great Britain | Feb. 29, 1936 |